US008720222B2

(12) United States Patent
Cur et al.

(10) Patent No.: US 8,720,222 B2
(45) Date of Patent: May 13, 2014

(54) HIGHER EFFICIENCY APPLIANCE EMPLOYING THERMAL LOAD SHIFTING IN REFRIGERATORS HAVING HORIZONTAL MULLION

(75) Inventors: Nihat Cur, St. Joseph, MI (US); Steven J. Kuehl, Stevensville, MI (US); Andrew D. Litch, St. Joseph, MI (US); Luiz Antonio D. Lopes, Peachtree City, GA (US); Guolian Wu, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 211 days.

(21) Appl. No.: 13/279,386

(22) Filed: Oct. 24, 2011

(65) Prior Publication Data

US 2013/0098081 A1     Apr. 25, 2013

(51) Int. Cl.
*F25D 13/02* (2006.01)
(52) U.S. Cl.
USPC ............................................. 62/442; 62/519
(58) Field of Classification Search
USPC ........................... 62/199, 333, 441, 442, 519
See application file for complete search history.

(56) References Cited

U.S. PATENT DOCUMENTS

| 2,123,497 | A | * | 7/1938 | Buchanan ...................... 62/200 |
| 4,383,421 | A | | 5/1983 | Quesnoit |
| 5,231,847 | A | | 8/1993 | Cur et al. |
| 5,251,455 | A | | 10/1993 | Cur et al. |
| 5,465,591 | A | * | 11/1995 | Cur et al. ....................... 62/439 |
| 5,473,901 | A | | 12/1995 | Roseen |
| 5,522,216 | A | | 6/1996 | Park et al. |
| 7,472,556 | B2 | | 1/2009 | Kirby et al. |
| 7,762,102 | B2 | | 7/2010 | Hamel et al. |
| 2003/0167789 | A1 | | 9/2003 | Tanimoto |
| 2005/0223721 | A1 | | 10/2005 | Kirby et al. |
| 2006/0201175 | A1 | * | 9/2006 | Shapiro et al. .................. 62/246 |
| 2009/0293514 | A1 | | 12/2009 | Junge |

FOREIGN PATENT DOCUMENTS

JP     2004317069 A2     11/2004

OTHER PUBLICATIONS

Effects of operating variables on heat transfer and energy consumption of a household refrigerator-freezer during closed door operation, Hasanuzzaman, M., et al., 2008.*
"Analysis of Refrigerator/Freezer Appliances Having Dual Refrigeration Cycles", Authors: Gan, Andre I, et al., Jan. 1, 2000.

* cited by examiner

Primary Examiner — Mohammad M Ali

(57) ABSTRACT

An appliance includes a cabinet; a first compartment; and a second compartment. The first compartment and the second compartment are separated by a horizontal mullion. The cabinet also typically includes a coolant system that has: a single compressor for regulating a temperature of the first compartment and a temperature of the second compartment operably connected to at least one evaporator; a shared coolant fluid connection system; and a coolant fluid spaced within the shared coolant fluid connection system used to regulate both the temperature of the first compartment and the second compartment. The compressor can provide the shared coolant at at least two different pressures to at least one evaporator using the shared coolant fluid connection circuit. The ratio of the substantially steady state heat gain for the first compartment to the substantially steady state total heat gain for the overall cabinet is about 0.65:1 or greater.

32 Claims, 11 Drawing Sheets

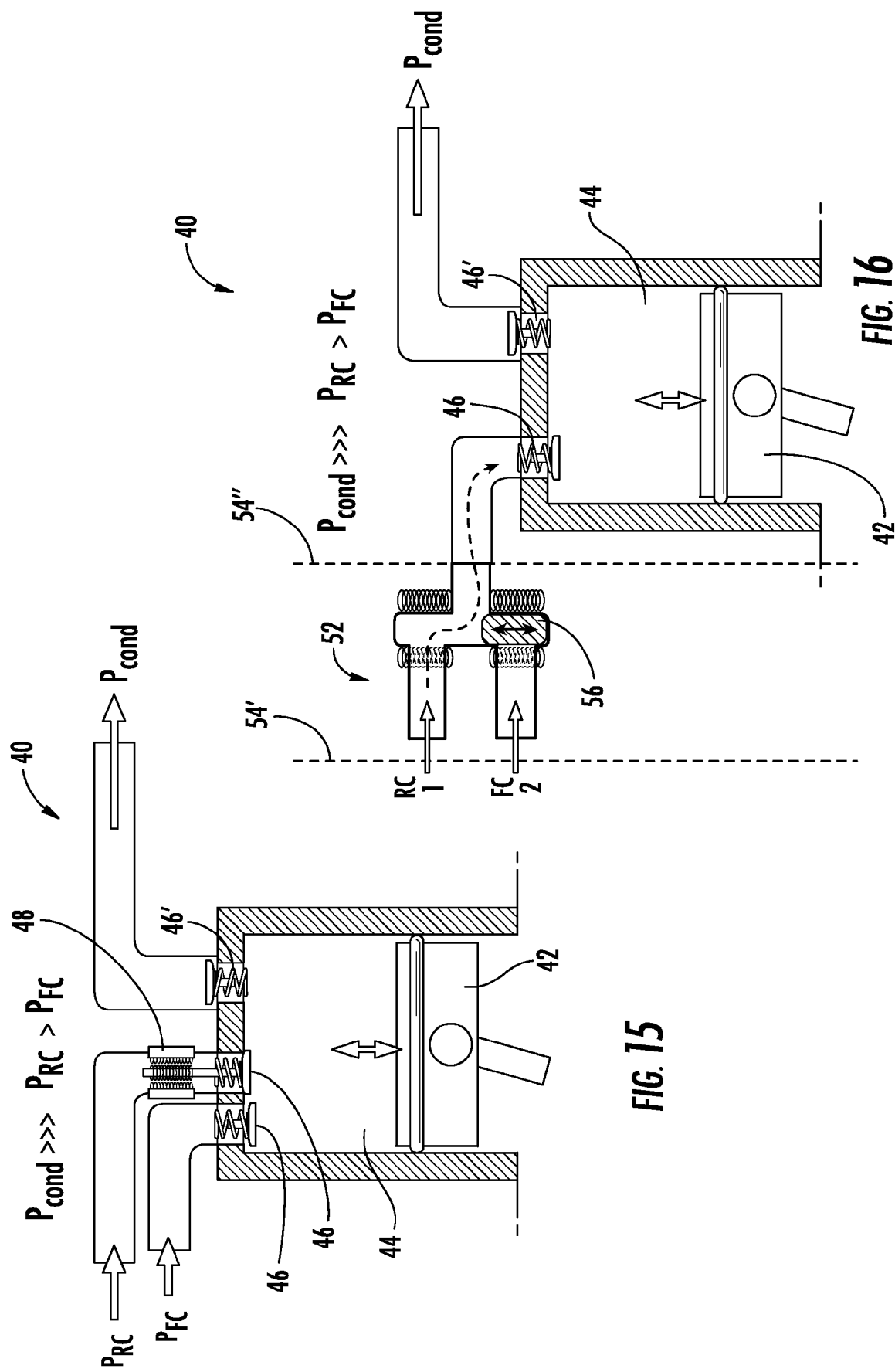

HIGHER EFFICIENCY APPLIANCE EMPLOYING THERMAL LOAD SHIFTING IN REFRIGERATORS HAVING HORIZONTAL MULLION

BRIEF SUMMARY OF THE INVENTION

An embodiment of the present invention generally includes an appliance that includes a cabinet with an internal volume; a first compartment having an internal volume spaced within the cabinet; and a second compartment having an internal volume spaced within the cabinet. The first compartment and the second compartment within the cabinet are typically separated by a (horizontal) mullion to form the first compartment and the second compartment within the cabinet and each compartment has at least one access door that only accesses that compartment. The overall cabinet has a substantially steady state total heat gain and the first compartment has a first compartment substantially steady state heat gain. The appliance also typically includes a coolant system that has: a single compressor operably connected to at least one evaporator where the single compressor is the only compressor associated with the appliance for regulating a temperature of the first compartment and a temperature of the second compartment; a shared coolant fluid connection system that interconnects at least the single compressor and at least one evaporator; and a coolant fluid spaced within the shared coolant fluid connection system used to regulate both the temperature of the first compartment and the second compartment. The compressor can provide the shared coolant at at least two different pressures to at least one evaporator using the shared coolant fluid connection circuit. Also, the ratio of the substantially steady state heat gain for the first compartment to the substantially steady state total heat gain for the overall cabinet is typically about 0.65:1 or greater (for horizontal mullion) and the first compartment is at a first temperature, typically a fresh food compartment above freezing, and the second compartment is at a second temperature, typically a temperature below the temperature of the first compartment such as a freezer compartment. In any embodiment of the present invention discussed herein, the first compartment and second compartment may be both below freezing, both above freezing or one above freezing and one below freezing.

Another aspect of the present invention is directed toward an appliance that includes a cabinet having an internal volume; a first compartment having an internal volume spaced within the cabinet; and a second compartment having an internal volume spaced within the cabinet where the first compartment and the second compartment within the cabinet are separated by a (horizontal) mullion to form the first compartment and the second compartment within the cabinet. Each compartment typically has at least one access door that only accesses that compartment and the overall cabinet has a substantially steady state total heat gain and the first compartment has a first compartment substantially steady state heat gain. The appliance also typically includes a coolant system that includes: a single compressor operably connected to at least one evaporator where the single compressor is the only compressor associated with the appliance for regulating a temperature of the first compartment and a temperature of the second compartment; a shared coolant fluid connection system that interconnects at least the single compressor and at least one evaporator; and a coolant fluid spaced within the shared coolant fluid connection system used to regulate both the temperature of the first compartment and the second compartment. The coolant system typically has at least two modes of operation, a first mode and a second mode, where the compressor provides the shared coolant at a first pressure level to at least one evaporator using the shared coolant fluid connection circuit in the first mode and the compressor provides the shared coolant at a second pressure level, which is different than the first pressure level, to at least one evaporator using the shared coolant fluid connection circuit in the second mode. The ratio of the substantially steady state heat gain for the first compartment to the substantially steady state total heat gain for the overall cabinet is about 0.65:1 or greater (horizontal mullion). The first compartment is typically at a first temperature, typically a fresh food compartment temperature above freezing, and the second compartment is at a second temperature, typically below the temperature of the first compartment such as the temperature of a freezer compartment.

Yet another aspect of the present invention includes a dual (or multiple, two or more) evaporator and single compressor containing appliance that includes: a cabinet having an internal volume, a first compartment having an internal volume spaced within the cabinet, and a second compartment having an internal volume spaced within the cabinet. The first compartment and the second compartment are separated by a (horizontal) mullion to form the first compartment and the second compartment within the cabinet and each compartment has at least one access door that typically only accesses that compartment. The overall cabinet typically has a substantially steady state total heat gain and the first compartment has a first compartment substantially steady state heat gain. A first evaporator is associated with the first compartment and operates at a first pressure level. A second evaporator is associated with the second compartment and operates at a second pressure level, which is a different pressure level than the first pressure level. A single compressor operably connected to the first evaporator and the second evaporator is also typically employed and the single compressor is typically the only compressor associated with the appliance for regulating the temperature of the first compartment and the temperature of the second compartment. The single compressor and the first and second evaporators form two (or more) refrigeration circuits that provide a flow of coolant in a non-simultaneous manner to the first and second evaporators such that the two refrigeration circuits provide the first evaporator and the second evaporator with adjustable load capacities and the ratio of the substantially steady state heat gain for the first compartment to the substantially steady state total heat gain for the overall cabinet is about 0.65:1 or greater (horizontal mullion configuration).

Another aspect of the present invention includes a method for improving the efficiency of an appliance. The method typically includes at least the steps of: 1) providing an appliance having at least two compartments, and 2) shifting the overall thermal load of the appliance to a higher operating temperature compartment. The appliance typically includes: a cabinet having an internal volume, a first compartment having an internal volume spaced within the cabinet, and a second compartment having an internal volume spaced within the cabinet where the first compartment and the second compartment within the cabinet are separated by a (horizontal) mullion to form the first compartment and the second compartment within the cabinet. Each compartment typically has at least one access door that only accesses that compartment and the overall cabinet has a substantially steady state total heat gain and the first compartment has a first compartment substantially steady state heat gain. The appliance also typically includes a coolant system that uses: at least one evaporator; a single compressor operably connected to at least one evaporator where the single compressor is the only compressor associated with the appliance for regulating a temperature of the first compartment and a temperature of the second compartment; a shared coolant fluid connection system that interconnects at least the single compressor and the at least one evaporator; and a coolant fluid spaced within the shared coolant fluid connection system used to regulate both the temperature of the first compartment and the second compartment. The compressor typically provides the shared coolant at at least two different pressures to at least one evaporator using the shared coolant fluid connection circuit. The step of shifting the overall thermal load of the appliance typically includes shifting the overall thermal load of the appliance (with a horizontal mullion) such that at least about 65% of the total substantially steady state heat gain of the overall cabinet is gained by the refrigeration/first compartment and thereby increasing the overall coefficient of performance of the appliance.

These and other features, advantages, and objects of the present invention will be further understood and appreciated by those skilled in the art by reference to the following specification, claims, and appended drawings.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings, certain embodiment(s) which are presently preferred. It should be understood, however, that the invention is not limited to the precise arrangements and instrumentalities shown. Drawings are not necessary to scale, but relative special relationships are shown and the drawings may be to scale especially where indicated. As such, in the description or as would be apparent to those skilled in the art. Certain features of the invention may be exaggerated in scale or shown in schematic form in the interest of clarity and conciseness.

FIG. 15 shows a compressor according to an aspect of the present invention showing dual suction;

FIG. 16 shows another embodiment of a compressor according to an aspect of the present invention showing dual suction.

DETAILED DESCRIPTION

Before the subject invention is described further, it is to be understood that the invention is not limited to the particular embodiments of the invention described below, as variations of the particular embodiments may be made and still fall within the scope of the appended claims. It is also to be understood that the terminology employed is for the purpose of describing particular embodiments, and is not intended to be limiting. Instead, the scope of the present invention will be established by the appended claims.

Where a range of values is provided, it is understood that each intervening value, to the tenth of the unit of the lower limit unless the context clearly dictates otherwise, between the upper and lower limit of that range, and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention.

In this specification and the appended claims, the singular forms 'a,' 'an' and 'the' include plural reference unless the context clearly dictates otherwise.

Figure 3:
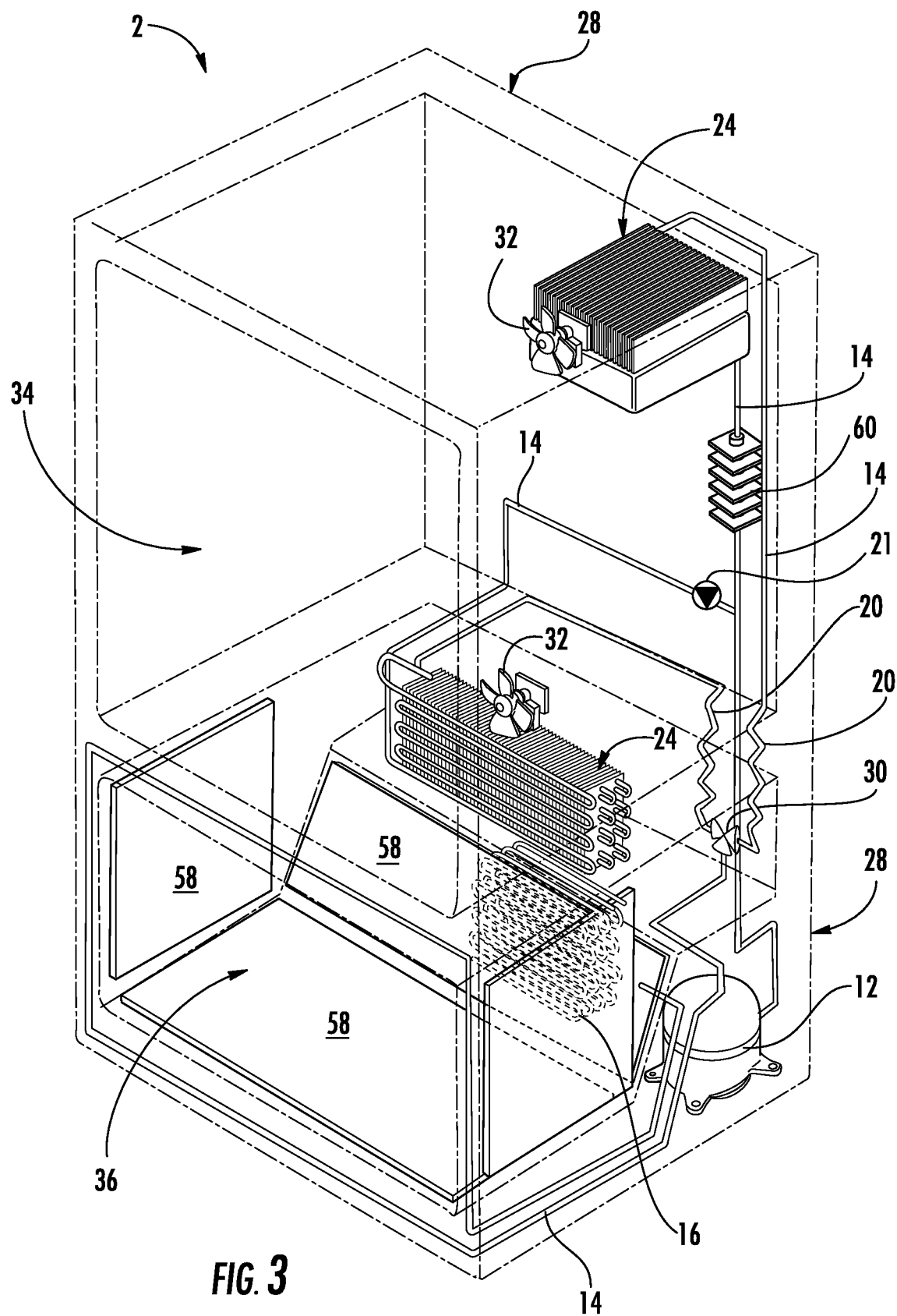
FIG. 3 is an interior schematic view of a dual evaporator refrigeration system according to an aspect of the present invention.
Figure 7:
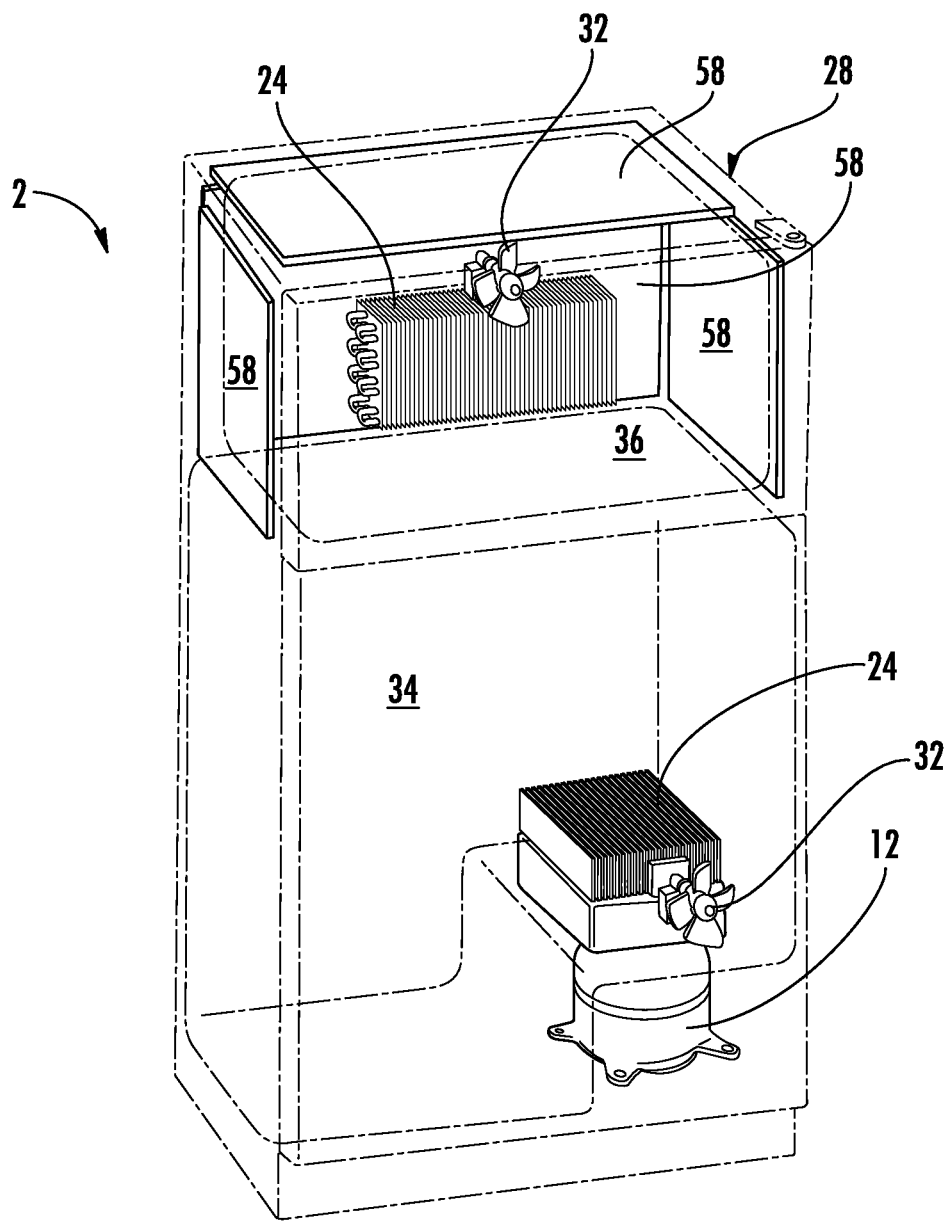
FIG. 7 shows a schematic view of a system according to the present invention incorporated into a top mount freezer configuration with a horizontal oriented mullion.
Figure 11:
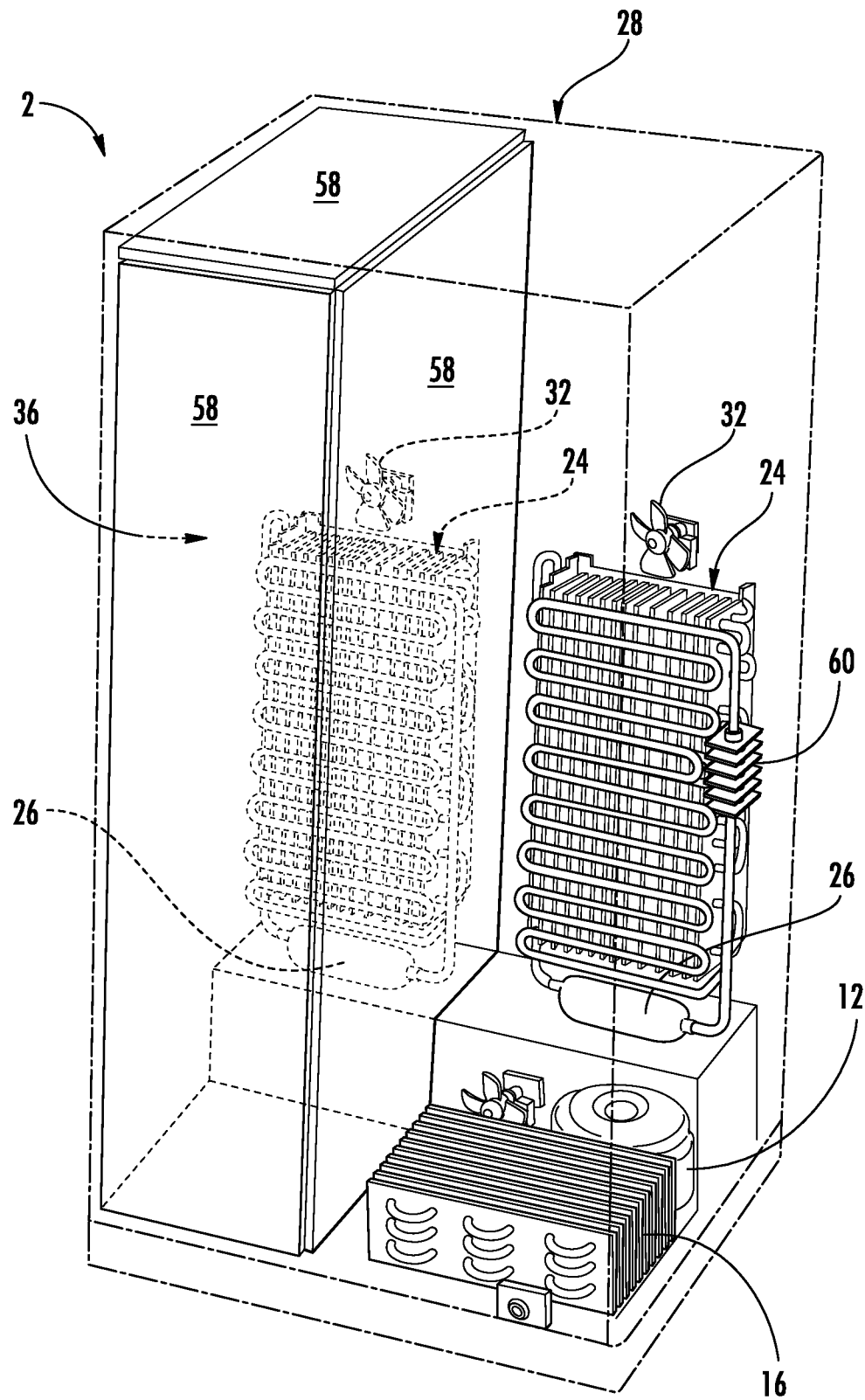
FIG. 11 shows a schematic view of another aspect of the present invention showing a coolant system in a side by side appliance system with a vertical mullion.

The present invention is generally directed toward appliance systems and methods for increasing the efficiency (coefficient of performance) of the appliance. The appliance systems may be bottom mount freezer systems (see FIG. 3), a top mount freezer system (see FIG. 7), a side by side refrigerator and freezer system (see FIG. 11), or a french door style bottom mount freezer system that may or may not employ a third compartment, typically a drawer that may operate as a refrigerator drawer or a freezer drawer (see FIG. 17). Generally speaking, the appliance gains efficiency by shifting the overall thermal load of the appliance 2 to a first compartment 34 from a second, lower temperature, compartment 36. The shifting of thermal load is used in conjunction with the system that employs at least one evaporator, but can incorporate multiple evaporators for the same or different appliance compartment. The compressor 12 may be a variable capacity compressor, such as a linear compressor. The compressor may be a single suction compressor or a dual suction compressor. When the compressor is a single suction compressor, it typically provides non-simultaneous dual suction from the coolant fluid conduits 14 from the refrigeration (fresh food) compartment and the freezer compartment.

As discussed above, the coolant system 10 utilized according to an aspect of the present invention typically includes a single compressor 12 operably connected to at least one evaporator 24 where the single compressor is typically the only compressor associated with the appliance for regulating the temperature of the first compartment 34 (typically the fresh food compartment) and the temperature of a second compartment 36 (typically the freezer compartment). The coolant system also typically employs fluid conduits 14, at least one condenser 16, a filter/dryer 18, and one or more expansion devices 20, such as a capillary tube or capillary tubes. The coolant system may also optionally employ one or more check valves 21 that prevent back flow of coolant fluid in the overall coolant system. Check valves are typically employed when a multiple evaporator coolant system is employed operating in a non-simultaneous manner.

Figure 1:
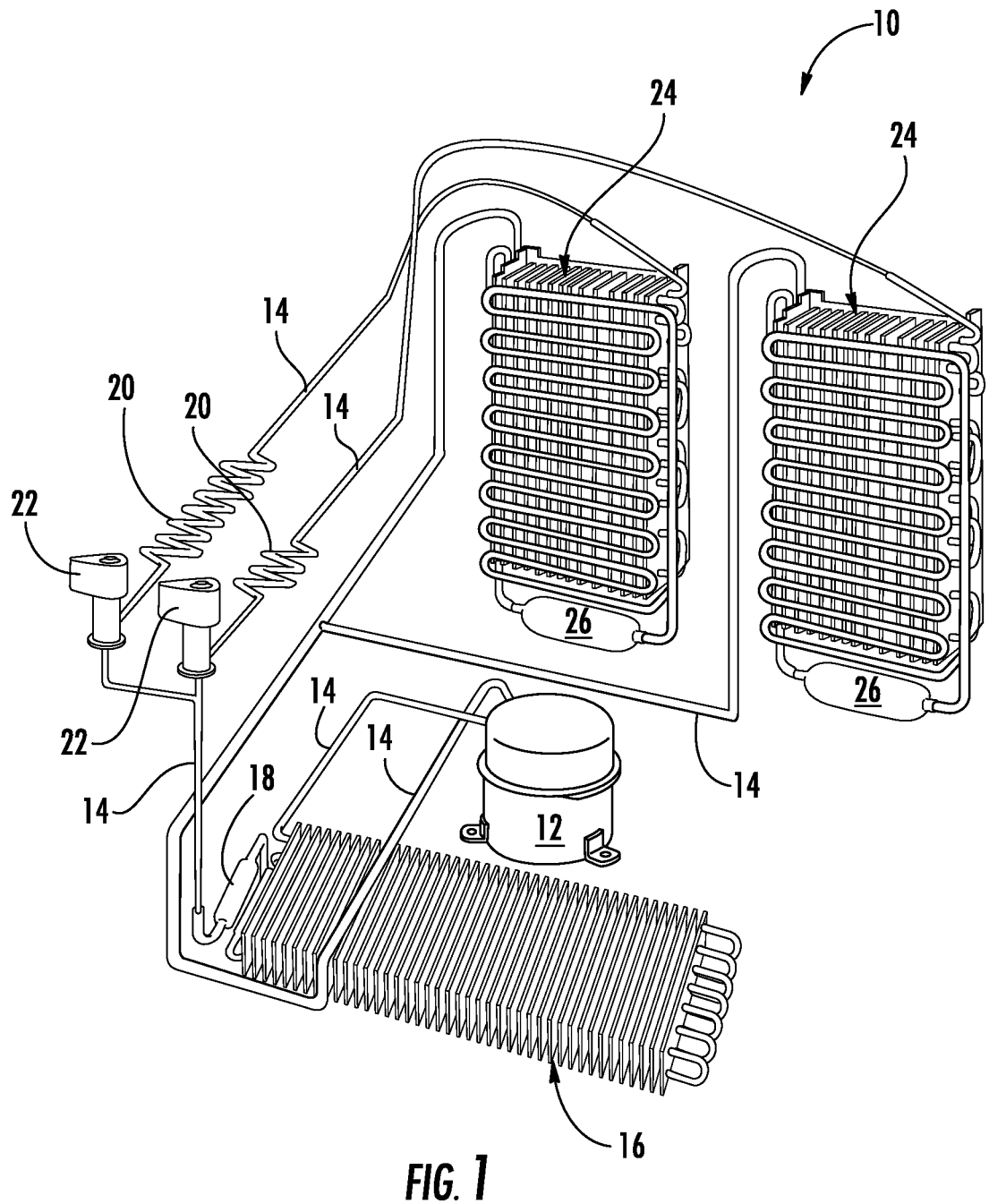
FIG. 1 is a schematic of a sequential dual evaporator system that may be utilized according to an aspect of the present invention.

As shown in FIG. 1, one aspect of the present invention utilizes a sequential dual evaporator refrigeration system as the coolant system 10. The dual evaporator refrigeration system shown in FIG. 1 employs two evaporators 24 fed by two fluid conduits engaged to two separate expansion devices 20. Due to evaporating pressure differences needed to cool the two compartments at different operating temperatures, the evaporators cannot operate simultaneously and thus are activated as cooling is needed in a given compartment. In this sense, a major advantage of the dual (or multiple) evaporator system is that the evaporator in the refrigerator compartment runs at a higher temperature, thereby increasing the overall coefficient of performance. The cycle analysis (shown in FIG. 2) indicates an approximate 28% increase in the overall coefficient of performance in such a system. This assumes that the refrigeration compartment represents about ⅓ of the total heat load and the evaporators in the refrigeration compartment and the freezer compartment operate at −15° F. (freezer compartment) and 10° F. (refrigeration compartment evaporator). The evaporators maintain the refrigeration (fresh food) compartment and the freezer compartment temperatures at 45° F. and 5° F. respectively.

Another aspect of the present invention includes a variation on the system not shown in FIG. 1. The variation includes a single evaporator fed by two capillary tubes in alternating patterns. Such a system requires more fluid conduits and flow switching valves/dampers, but may be utilized. When a single evaporator 24 is employed, the single evaporator is typically a multi-air stream single evaporator that is capable of receiving coolant at two different pressures from the fluid conduits that receive coolant from the compressor.

Figure 2:
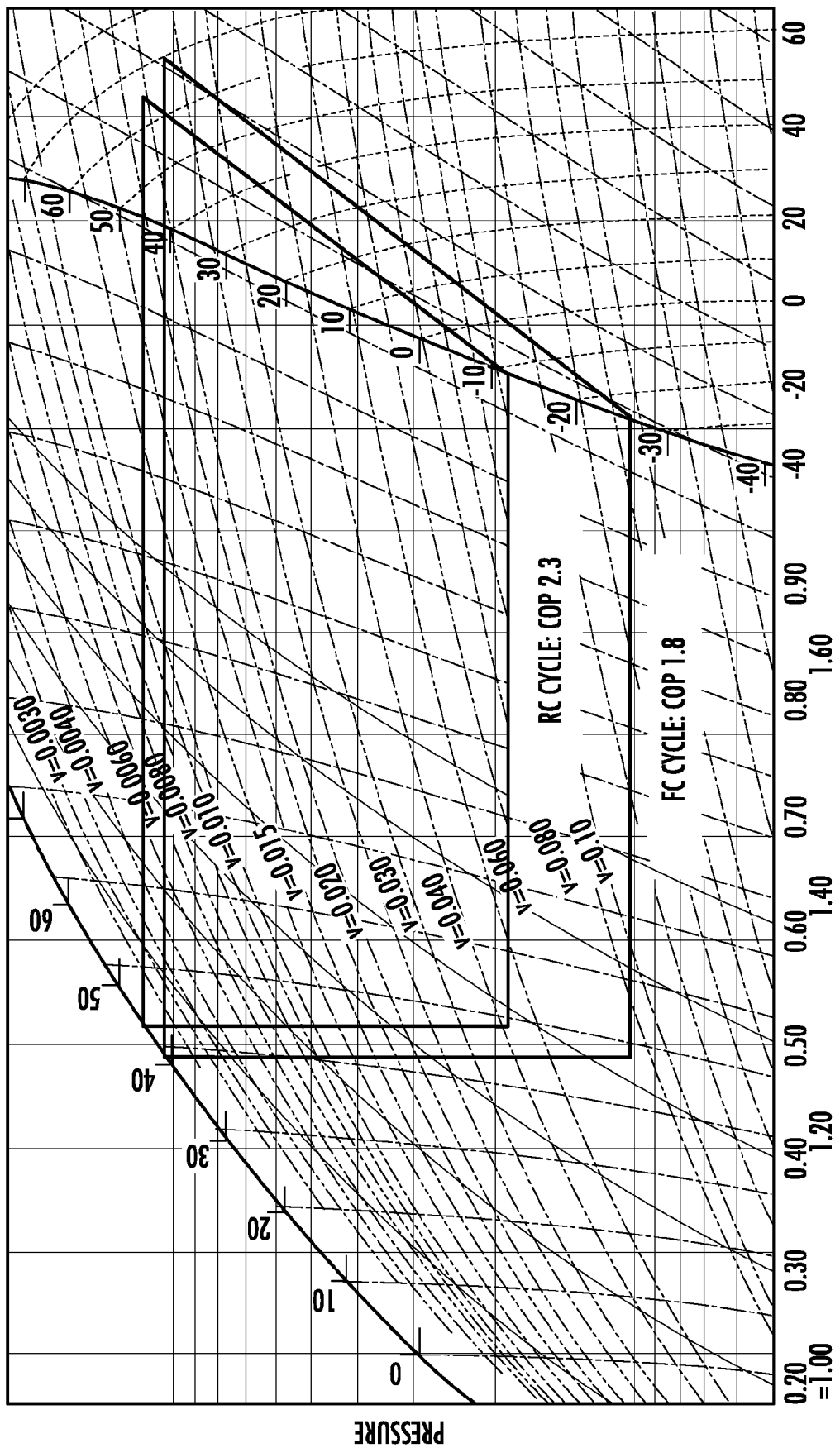
FIG. 2 is a thermodynamic cycle of a sequential dual evaporator refrigeration system that may be utilized in connection with the thermal load shifting employing methods of improving efficiency of the appliance according to an aspect of the present invention.

As shown in FIG. 2, the thermodynamic cycles of a sequential dual evaporator refrigeration system gains efficiency from the sequential dual evaporator's use in connection with the refrigeration compartment operation. The refrigeration compartment operation enables the refrigeration system to have a much higher cycle efficiency due to the higher operating temperature. The overall coefficient of performance is a weighted average of the coefficient of performance of the freezer operation and the refrigeration (fresh food) compartment operation as follows:

$$COP_{Total} = x \times COP_{RC} + (1-x) \times COP_{FC}$$

"x" is the ratio refrigerator compartment heat gain to the total heat gain. The same general calculation is applicable when the compartments are both refrigeration compartments or both freezer compartments, but where one compartment is operated at a higher operating temperature than another compartment of the appliance. The overall coefficient of performance depends on the ratio of the refrigeration compartment heat gain to that of the entire appliance. The higher this ratio, the better the overall coefficient of performance. In the context of the present invention, the ratio of the steady state heat gain for the refrigeration compartment (the first higher temperature compartment) to the steady state total heat gain for the overall cabinet when the refrigeration compartment and the freezer compartment (first compartment and second compartment) are separated by vertical mullion is about 0.50:1 or greater. When the compartments are separated by a horizontal mullion, the ratio is about 0.65:1 or greater.

As discussed above, the first compartment is typically the refrigeration or fresh food compartment. The second is typically the freezer compartment. While this is the typical configuration, configuration could conceivably be two refrigeration compartments or two freezer compartments. So long as the first compartment is at a higher temperature than the second compartment, whether both are above freezing or below freezing, efficiencies are gained. As shown in various figures, including FIGS. 3, 7 and 11, the appliance may be any of the known configurations for a refrigeration appliance typically employed. They include a bottom mount freezer, a top mount freezer, and a side by side configuration. In the case of the top mount and bottom mount freezer, the mullion separating the compartments is typically a horizontal mullion. In the case of a side by side configuration, the mullion separating the two compartments is a vertical mullion. When the first compartment and second compartment are separated by a horizontally oriented mullion, the ratio of the internal volume of the second compartment to the internal volume of the overall cabinet is about 0.15:1 or greater, about 0.25:1 or greater, about 0.27:1 or greater, about 0.3:1 or greater. The ratio is typically from about 0.25:1 to about 0.37:1. When the mullion is a vertically oriented mullion, the ratio of the internal volume of the second compartment to the internal volume of the cabinet is typically about 0.37:1 or greater.

Figure 18:
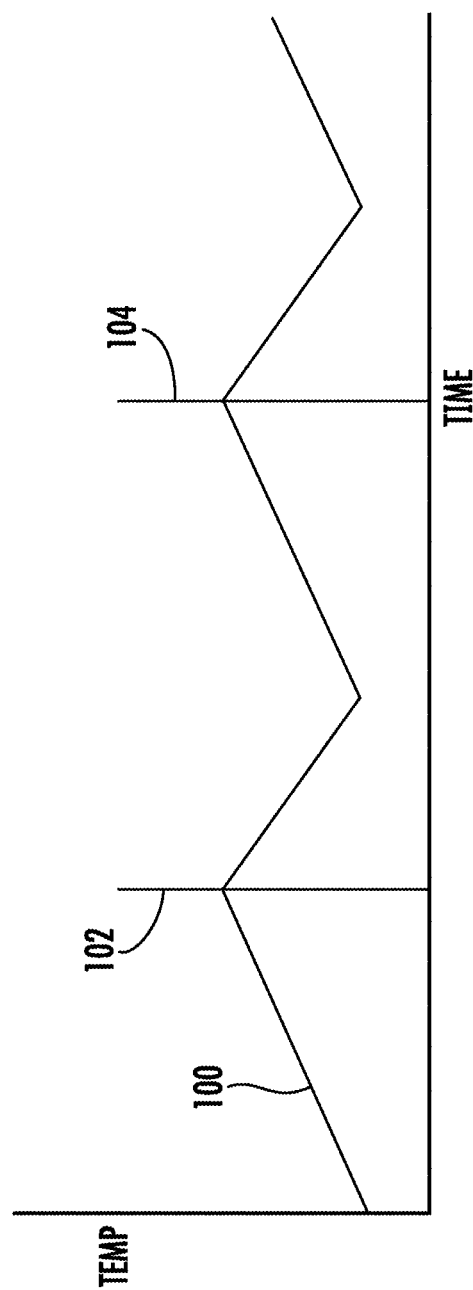
FIG. 18 is a schematic graphical illustration of time versus temperature within a freezer compartment.

While the ratio of the steady state heat gain for the first compartment to the steady state total heat gain for the overall cabinet when the first and second compartments are separated by a vertical mullion is about 0.50:1 or greater, this ratio may be about 0.52:1 or greater, about 0.65:1 or greater, or about 0.80:1 or greater. In the case when the first compartment and the second compartment are separated by a horizontal mullion, the ratio of the substantially steady state heat gain for the first compartment to the substantially steady state total heat gain for the overall cabinet may be about 0.65:1 or greater, about 0.66:1 or greater, or, about 0.69:1 or greater. In the context of the present invention, the term "substantially steady state heat gain" refers to the heat gain of the appliance system (overall cabinet) or portion of the appliance system (one of the compartments) when in operation and at its standard (user-determined) settings and at the condition meeting those settings. The term "substantially steady state heat gain" is meant to take into account the physical reality that the overall appliance is never at a steady state because the interior compartments of the appliance are at a lower temperature than the ambient air. Therefore, there is at least to some extent, decay/heat gain to the overall appliance. Applicants recognize by use of this statement that the overall refrigerator is in a dynamic state; however, it is meant to refer when the decay rates are slow such they seem static over a longer period of time. For example, a decay-cooling cycle is illustrated schematically in FIG. 18. In that graph, there is a curve 100 shown schematically as a linear sawtooth curve, although in reality the segments of that curve would most likely not be linear. The curve 100 represents the increase and decrease of temperature within the freezer compartment over time. The positively sloped segments represent times when an evaporator 24 is not being cooled and the negatively sloped portions of the curve represent those times when the evaporator 24 is providing cooling. A first point in time is designated by vertical line 102 which represents the initiation of a cooling cycle, that is the initiation of cooling by the freezer evaporator. A subsequent vertical line 104 represents a subsequent initiation of the cooling cycle by the evaporator.

Figure 17:
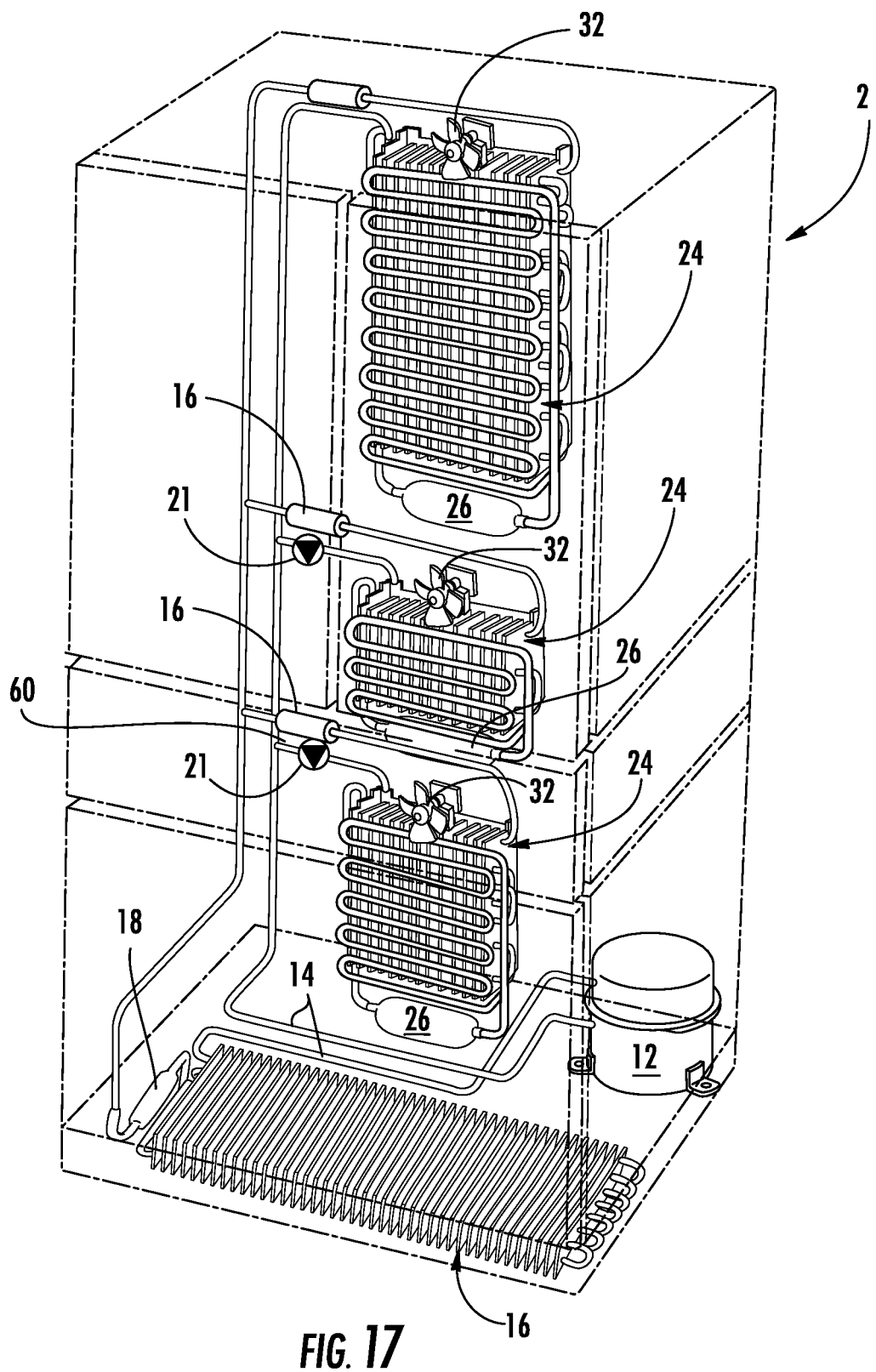
FIG. 17 shows a schematic view of another aspect of the present invention showing a coolant system employing three evaporators in a bottom mount freezer configuration with French doors and a drawer (third compartment) that may be a freezer drawer or fresh food drawer compartment.

An aspect of the present invention includes increasing the efficiency of the appliance by shifting the overall thermal load of the appliance such that at least 50% of the total steady state heat gain of the overall appliance is gained by the refrigeration compartment when the first and second compartment are separated by a vertical mullion and at least about 65% of the total substantially steady state heat gain of the overall cabinet is gained by the first compartment (fresh food compartment) to thereby increase the overall coefficient of performance of the coolant system of the appliance. As shown in at least FIGS. 3, 7, 11 and 17, and mentioned previously, the cooling systems may be incorporated into a variety of appliance configurations, including a bottom mount freezer system (FIG. 3), a top mount freezer system (FIG. 7), a side by side configuration (FIG. 11), and a French door configuration that may or may not further include an optional third drawer that may function as either a freezer or a refrigerator (fresh food) compartment (FIG. 17). Generally speaking, each of the embodiments employ at least two compartments, a first compartment 34, which is typically a fresh food compartment or a compartment operating at a higher operating temperature than a second compartment 36, which is typically a freezer compartment. In the context of FIG. 17, a third evaporator 24 may be utilized for the third compartment 38, which, as discussed above, can function as a refrigerator drawer or freezer drawer. In connection with each application, typically a single compressor 12 is utilized. Fluid conduits 14 provide fluid flow from the compressor to at least one condenser 16, through a filter/dryer 18 (when utilized), through at least one expansion device 20 such as a capillary tube or tubes, and to at least one evaporator, more typically multiple evaporators. Ultimately, fluid is returned to the compressor. Fans 32 are generally positioned proximate the evaporator(s) to facilitate cooling of the compartment/heat transfer. Similarly, fans 32 may be used in conjunction with the condenser (see FIG. 11).

The compressor 22 may be a standard reciprocating or rotary compressor, a variable capacity compressor, including but not limited to a linear compressor, or a multiple intake compressor system (see FIGS. 15-16). As shown in FIGS. 15-16, a compressor according to an aspect of the present invention may utilize a compressor system 40 that contains two coolant fluid intake streams from the refrigerator compartment or the freezer compartment evaporator(s). When a linear compressor is utilized, the linear compressor has a variable capacity modulation, which is larger than a 3 to 1 modulation capacity typical with a variable capacity reciprocating compressor.

FIGS. 15 and 16 generally show dual suction port compressor systems. A condenser piston 42 and two ways of dual intake of coolant fluid are shown respectively in FIGS. 15 and 16. In the case of FIG. 15, coolant fluid is received into the piston chamber 44 from the refrigerator compartment and freezer compartment (first compartment and second compartment) fluid conduits when the piston is drawn backward, the piston chamber valves 46 are both opened, or, when the solenoid switch 48 is activated, only coolant fluid from the second compartment (freezer compartment) fluid conduit is drawn in, and the piston chamber valve 46 associated with the intake from the first compartment (fresh food/refrigeration compartment) fluid conduit is not actuated, but retained in a closed position. When the piston stroke is actuated toward the piston chamber valves, piston chamber valve 46' is opened by fluid pressure to allow coolant fluid to pass to the condenser 16.

An alternative embodiment is shown in FIG. 16, which shows a single piston chamber intake valve 46, which is fed from a valving system 52. The valving system as shown by lines 54' and 54", which represent the housing of the compressor, may be within the housing of the compressor when the housing is at position 54' relative to the valving system and outside of the housing when the housing is in position 54" relative to the valving system. The position of the housing 54 in FIG. 16 is simply meant to display that the valving system may be outside of the housing or within the housing of the compressor. The valving system 52 employs a switching mechanism which typically is a magnetically actuated solenoid system where obstruction 56 is actuated between a first position (shown) allowing refrigerant coolant to flow from the refrigeration compartment evaporator and a second position (not shown) where the obstruction 56 is positioned to block fluid paths from the refrigerator compartment evaporator and allow refrigerant to flow from the freezer compartment evaporator. In either embodiment (FIG. 15 or 16) of the dual suction port compressor systems, the pressure of the coolant fluid leaving the compressor for the condenser is significantly higher than the pressure of the coolant received from the refrigeration compartment or the freezer compartment, but the pressure of the coolant received from the refrigeration compartment fluid conduit is greater than the coolant received from the freezer compartment fluid conduit. This, as discussed above, allows for greater efficiencies of the overall coolant system.

Figure 6:
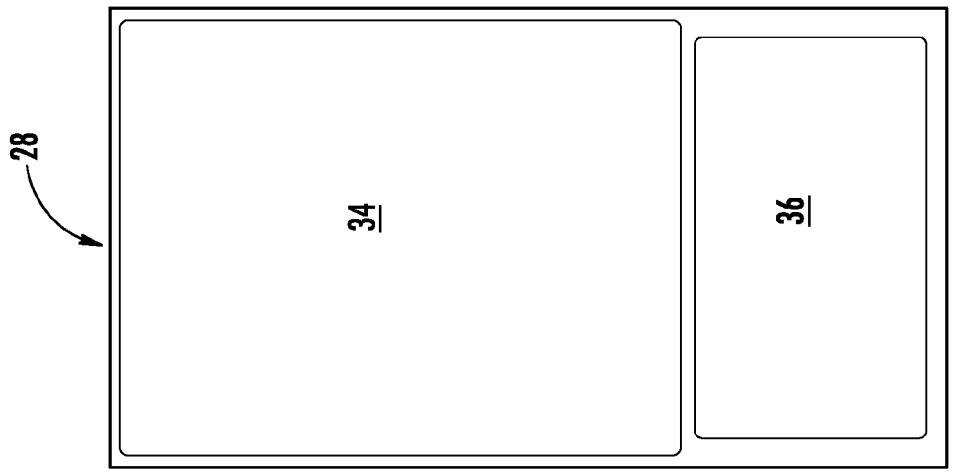
FIG. 6 demonstrates another embodiment of shifting the overall thermal load to the fresh food compartment by thinning the insulated layer around the fresh food compartment.
Figure 5:
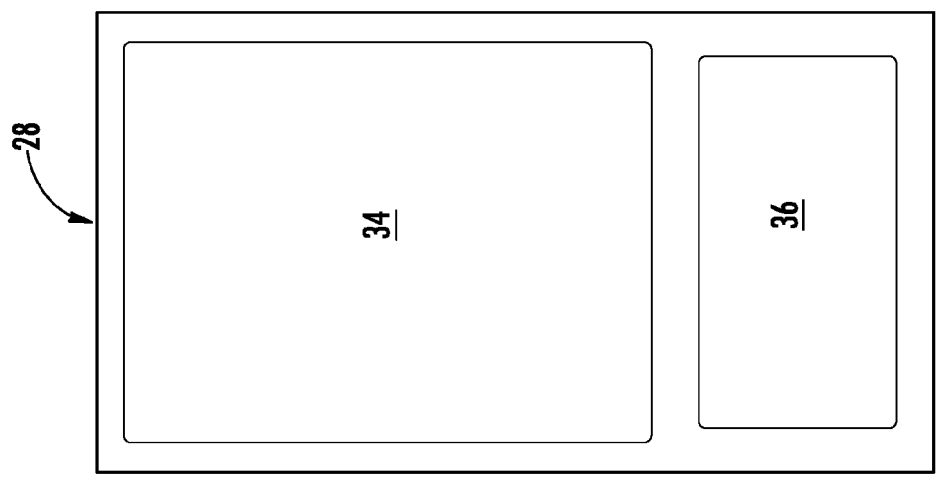
FIG. 5 shows an aspect of the present invention incorporating greater insulation capacity around the bottom mount freezer.
Figure 4:
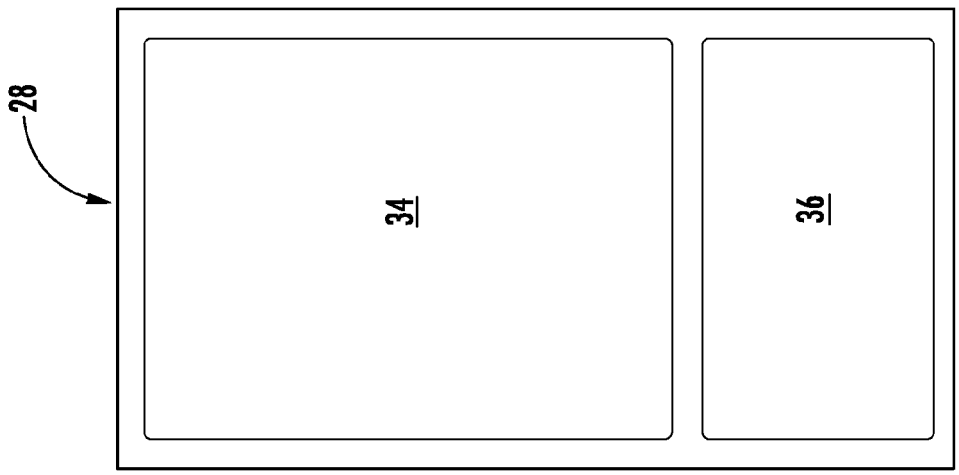
FIG. 4 shows a standard insulated bottom freezer refrigeration unit with insulation evenly spaced around the bottom freezer compartment and in the top refrigeration compartment.
Figure 10:
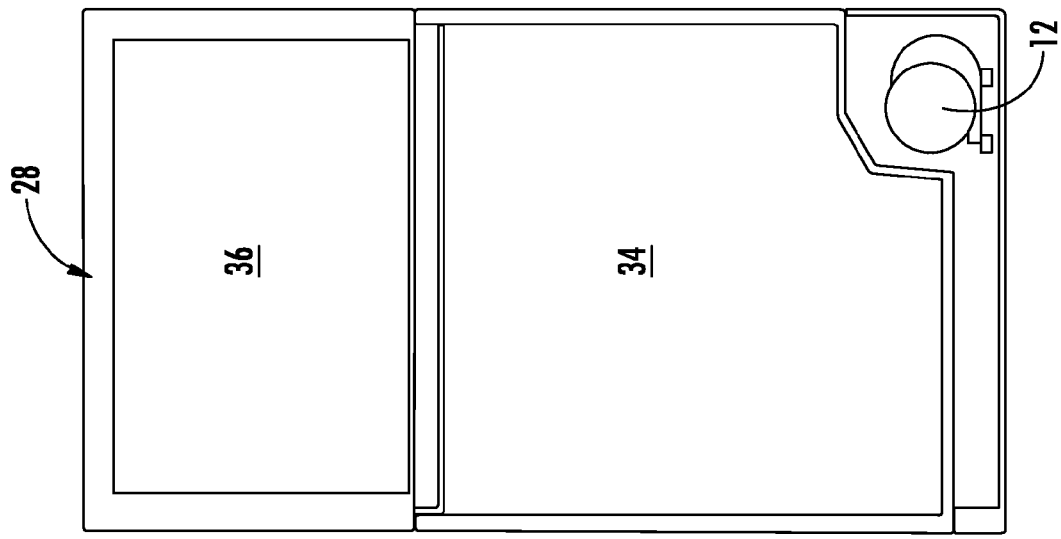
FIG. 10 shows lessened insulated capacity around the fresh food compartment than the freezer compartment in another method to shift the overall thermal load to the refrigeration compartment.
Figure 9:
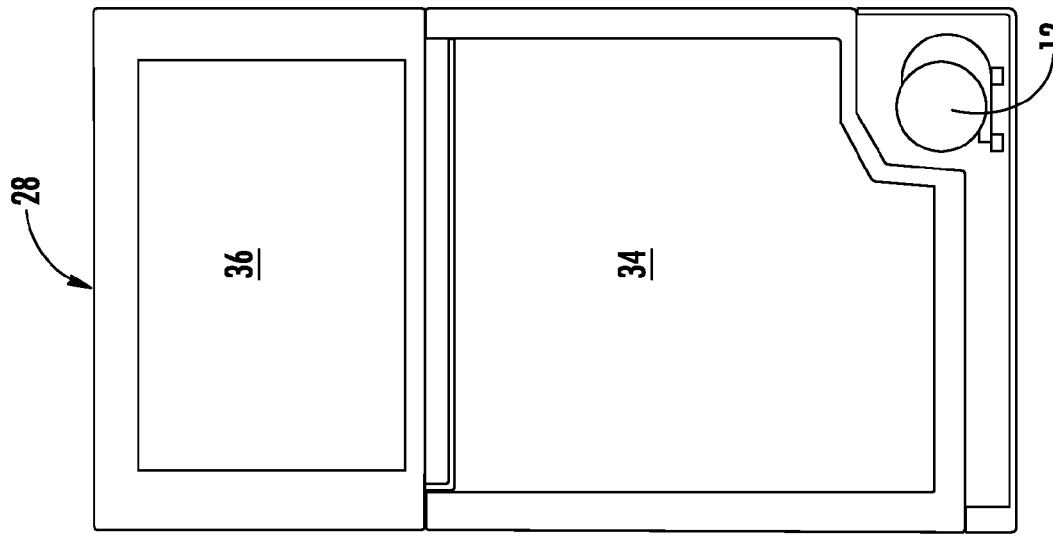
FIG. 9 shows higher insulated capacity around the freezer compartment to shift the overall thermal load of the appliance to the fresh food compartment.
Figure 8:
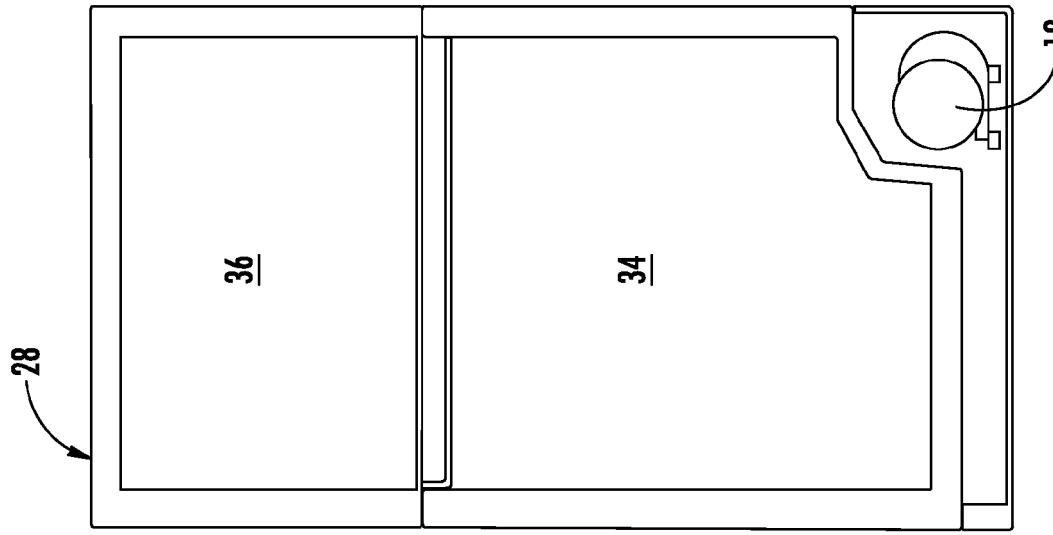
FIG. 8 shows a top mount freezer with standard insulated capacity around the walls of both the freezer compartment and the fresh food compartment.
Figure 14:
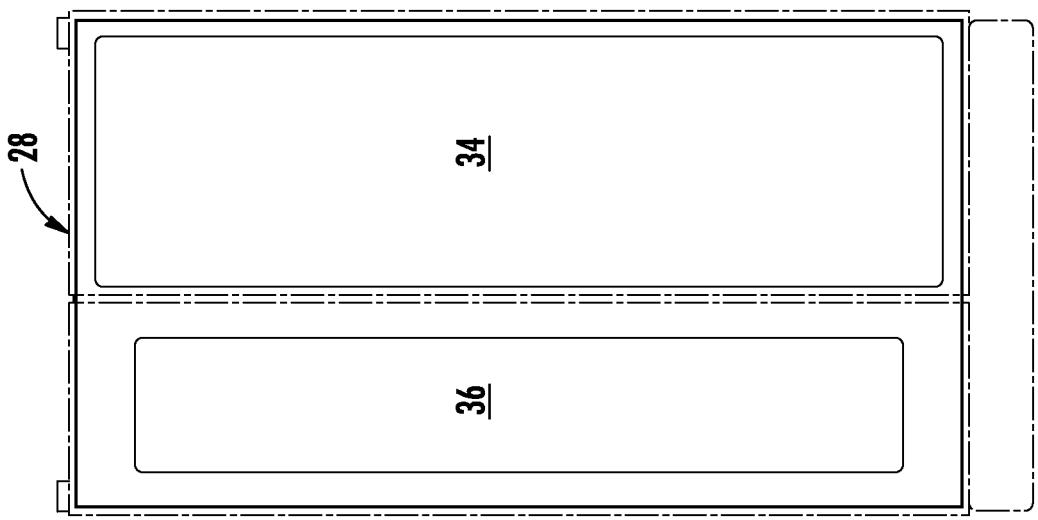
FIG. 14 shows a side by side appliance with lesser insulated capacity around the fresh food compartment than the freezer compartment to shift the overall thermal load to the refrigeration compartment.
Figure 13:
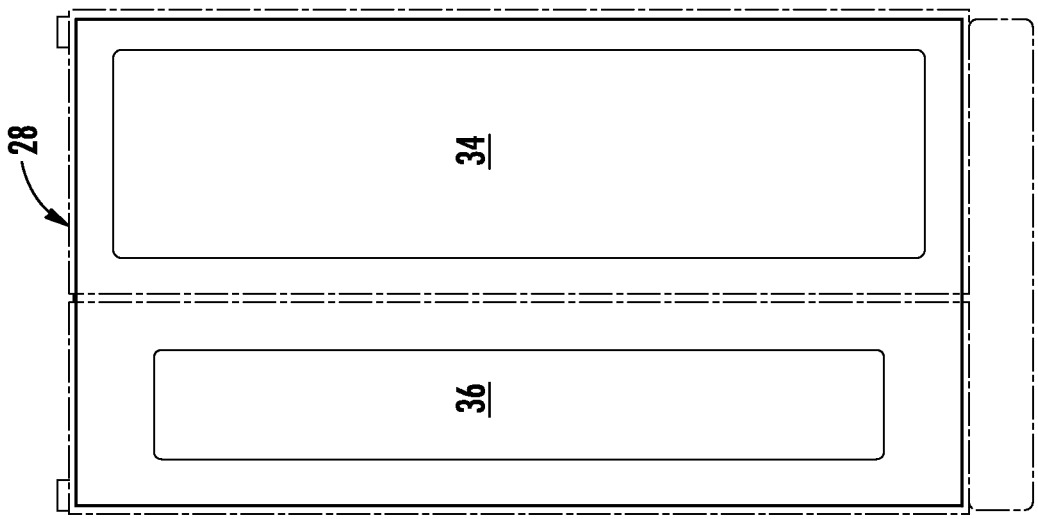
FIG. 13 shows an increased insulated capacity around the freezer compartment to thereby shift the overall thermal load of the appliance to the fresh food compartment.
Figure 12:
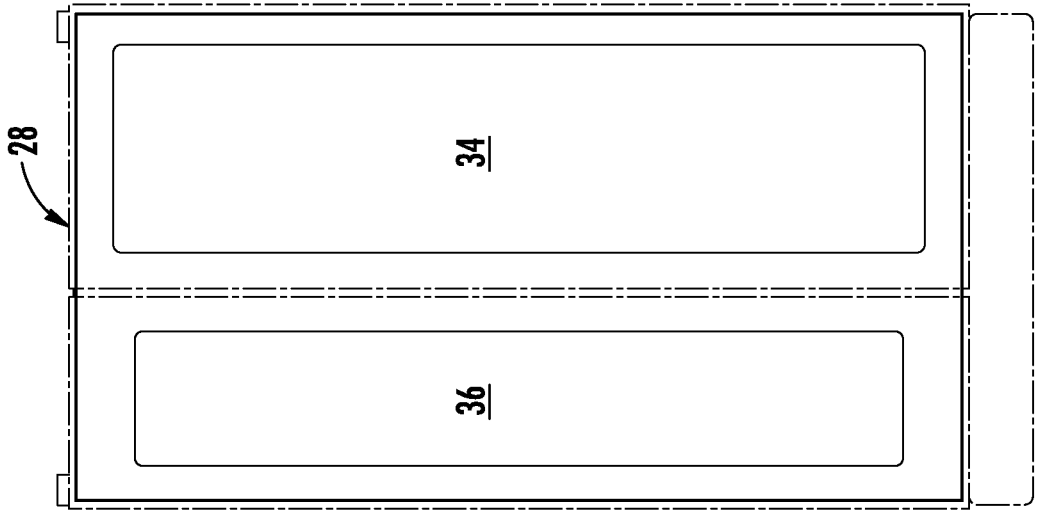
FIG. 12 shows the standard insulated capacity and a side by side refrigeration appliance.

As discussed generally above, the efficiency of the overall appliance is enhanced by shifting the thermal load of the coolant systems to the first compartment (higher temperature than the second compartment, typically the refrigeration compartment). This can be done in a variety of manners, but typically would be accomplished by one or more of the following: increasing the overall insulating capacity of the walls surrounding the second (freezer/lower temperature) compartment; increasing the internal volume of the refrigeration compartment without increasing the overall size of the appliance cabinet, and/or by reducing the internal volume of the second (freezer/lower temperature) compartment. One or more of these ways to shift the thermal load to the first compartment employed in any one appliance. FIGS. 4 and 8 show a bottom mount and top mount freezer configuration with no modifications while FIG. 12 shows a side by side system with no modifications. FIGS. 5, 9 and 13 show a configuration with increased insulation capacity around the freezer and lower freezer volume (either of these may be employed) instead of or in addition to one another. While this is shown in the drawings as a "thicker" walled freezer, insulation systems with higher insulative capacity may be used such that dimensions may or may not change. FIGS. 6, 10 and 14 show a larger internal volume for the first compartment 34. The larger internal volume for the first compartment (typically the fresh food compartment) is desired by many consumers to hold more foodstuffs. In such a system, the overall energy usage may be the same or less than an unmodified appliance employing a traditional coolant system despite the overall increase in internal volume of the first compartment (fresh food compartment). As discussed above, in an alternative embodiment, vacuum insulation panels 58, or other systems of increased insulated capacity over standard insulated walls may be utilized around the second compartment 36 (see generally FIG. 3). As a result, wall thickness of the appliance may or may not change, but can depend upon the insulative systems used. The use of higher insulation capacity technologies such as vacuum insulation panels in greater amount/thickness would further increase the thermal load shift from the second compartment to the first compartment.

When the internal volume of the first compartment 34 is increased, it can be increased to a limiting minimum wall thickness that is determined by external condensation on the exterior for the either fresh food compartment or freezer compartment and freezing on the interior of the fresh food side of the mullion separating the first compartment 34, typically the fresh food compartment, and the second compartment 36, typically the freezer compartment or a compartment with a lower average temperature than the first compartment. Another limiting factor for wall thickness is the flow of insulation foam, typically polyurethane foam. If the space is too small, the foam will not flow properly. The first compartment 34 typically uses insulation foam, typically polyurethane foam at about 37 mm. That thickness can be reduced according to the present invention to about 20 mm, but more typically will have a reduced thickness of less than about 30 mm, but any thickness less than the typically used, about 37 mm could be used and some benefits seen. The thickness of the first compartment walls can be changed by up 11.2%, up to about 14% and even as much as up to about 16% and any range between about 11% and 16% from the original thickness. The overall first compartment volume may increase by as much as about 1.5%. The second compartment 36 (typically a freezer compartment) wall thickness to first compartment (typically a fresh food compartment) 34 wall thickness ratio is typically a ratio of about 1.35 to 1 or greater, more typically of about 1.4 to 1 or greater, and most typically a ratio of 1.43 to 1 or greater. These changes may be accomplished and, according to one aspect of the present invention, no increased energy usage would be required over a standard configuration appliance of the same type.

Additionally, thermal storage material may also be used to further enhance efficiencies of the appliance. Thermal storage material 60, which can include phase changing material or metal solids, can be operably connected to the first compartment evaporator. The thermal storage material may be in thermal contact or engagement with the first compartment evaporator, in thermal contact or engagement with the fluid line operably connected to the first compartment evaporator, or in thermal contact or engagement with both. The use of the thermal storage material helps prevent "down" time of the compressor.

Those skilled in the art will recognize, or be able to ascertain using no more than routine experimentation, many equivalents to the specific embodiments of the invention described herein. Such equivalents are intended to be encompassed by the following claims.

The invention claimed is:

1. An appliance comprising:
    a cabinet having an internal volume and comprising a first compartment having an internal volume spaced within the cabinet and a second compartment having an internal volume spaced within the cabinet where the first compartment and the second compartment within the cabinet are separated by a horizontal mullion to form the first compartment and the second compartment within the cabinet and wherein each compartment has at least one access door that only accesses that compartment and the overall cabinet has a substantially steady state total heat gain and the first compartment has a first compartment substantially steady state heat gain;
    a coolant system comprising: a single compressor operably connected to at least one evaporator where the single compressor is the only compressor associated with the appliance for regulating a temperature of the first compartment and a temperature of the second compartment;
    a shared coolant fluid connection system that interconnects at least the single compressor and at least one evaporator;
    a coolant fluid spaced within the shared coolant fluid connection system used to regulate both the temperature of the first compartment and the second compartment; and
    wherein the compressor provides the shared coolant at at least two different pressures to at least one evaporator using the shared coolant fluid connection circuit;
    wherein the ratio of the substantially steady state heat gain for the first compartment to the substantially steady state total heat gain for the overall cabinet is about 0.65:1 or greater; and
    wherein the first compartment is at a first temperature and the second compartment is at a second temperature below the first temperature when the appliance is in operation.

2. The appliance of claim 1, wherein the ratio of the internal volume of the second compartment to the internal volume of the cabinet is 0.27:1 or greater and wherein the first compartment is a fresh food compartment at a temperature above freezing and the second compartment is at a temperature below freezing.

3. The appliance of claim 1, wherein the ratio of the internal volume of the second compartment to the internal volume of the cabinet is 0.3:1 or greater.

4. The appliance of claim 1, wherein the ratio of the internal volume of the second compartment to the internal volume of the cabinet is about 0.25:1 or greater.

5. The appliance of claim 1, wherein the ratio of the internal volume of the second compartment to the internal volume of the cabinet is about 0.15:1 or greater.

6. The appliance of claim 5 further comprising a first evaporator associated with the first compartment wherein the first evaporator operates at a first pressure level; and
    a second evaporator associated with the second compartment wherein the second evaporator operates at a second pressure level, which is a different pressure level than the first pressure level; and
    wherein the single compressor is operably connected to the first evaporator and the second evaporator and the single compressor is the only compressor associated with the appliance for regulating the temperature of the first compartment and the temperature of the second compartment; and
    wherein the single compressor and the first and second evaporators form two refrigeration circuits that share coolant and provide a flow of coolant fluid in a non-simultaneous manner to the first and second evaporators such that the two refrigeration circuits provide the first evaporator and the second evaporator with adjustable load capacities.

7. The appliance of claim 6, wherein the single compressor has a single suction port and the flow of coolant is provided in a non-simultaneous manner to the first evaporator and second the second evaporator.

8. The appliance of claim 6, wherein the single compressor has at least two suction ports and the flow of coolant is capable of being provided to the first evaporator and the second evaporator in a manner chosen from the group consisting of: a simultaneous manner, a non-simultaneous manner, and both a simultaneous manner and non-simultaneous manner.

9. The appliance of claim 6 further comprising a thermal storage material engaged with and operably connected to the first evaporator.

10. The appliance of claim 7 further comprising a thermal storage material engaged with and operably connected to the first evaporator.

11. The appliance of claim 8 further comprising a thermal storage material engaged with and operably connected to the first evaporator.

12. The appliance of claim 9, wherein the thermal storage material is a phase changing thermal storage material.

13. The appliance of claim 10, wherein the thermal storage material is a phase changing thermal storage material.

14. The appliance of claim 11, wherein the thermal storage material is a phase changing thermal storage material.

15. The appliance of claim 7 further comprising a thermal storage material in thermal communication with the first compartment and the first evaporator along a coolant flow pathway.

16. The appliance of claim 8, wherein the ratio of the substantially steady state heat gain for the first compartment to the substantially steady state total heat gain for the overall cabinet is 0.69:1 or greater.

17. The appliance of claim 1, wherein the ratio of the substantially steady state heat gain for the first compartment to the substantially steady state total heat gain for the overall cabinet is 0.69:1 or greater.

18. The appliance of claim 1, wherein the ratio of the substantially steady state heat gain for the first compartment to the substantially steady state total heat gain for the overall cabinet is 0.66:1 or greater.

19. The appliance of claim 1, wherein the ratio of the substantially steady state heat gain for the first compartment to the substantially steady state total heat gain for the overall cabinet is 0.69:1 or greater, and wherein the single compressor is a variable capacity compressor.

20. The appliance of claim 19, wherein the single compressor is a linear variable capacity compressor.

21. The appliance of claim 2, wherein the ratio of the substantially steady state heat gain for the first compartment to the substantially steady state total heat gain for the overall cabinet is 0.69:1 or greater, and wherein the single compressor is a linear variable capacity compressor.

22. The appliance of claim 5, wherein the ratio of the substantially steady state heat gain for the first compartment to the substantially steady state total heat gain for the overall cabinet is 0.69:1 or greater, and wherein the single compressor is a variable capacity compressor.

23. The appliance of claim 5, wherein the ratio of the substantially steady state heat gain for the first compartment to the substantially steady state total heat gain for the overall cabinet is 0.66:1 or greater.

24. An appliance comprising:
a cabinet having an internal volume and comprising a first compartment having an internal volume spaced within the cabinet and a second compartment having an internal volume spaced within the cabinet where the first compartment and the second compartment within the cabinet are separated by a horizontal mullion to form the first compartment and the second compartment within the cabinet and wherein each compartment has at least one access door that only accesses that compartment and the overall cabinet has a substantially steady state total heat gain and the first compartment has a first compartment substantially steady state heat gain;
a coolant system comprising: a single compressor operably connected to at least one evaporator where the single compressor is the only compressor associated with the appliance for regulating a temperature of the first compartment and a temperature of the second compartment;
a shared coolant fluid connection system that interconnects at least the single compressor and at least one evaporator;
a coolant fluid spaced within the shared coolant fluid connection system used to regulate both the temperature of the first compartment and the second compartment; and
wherein the coolant system has at least two modes of operation, a first mode and a second mode, wherein the compressor provides the shared coolant at a first pressure level to at least one evaporator using the shared coolant fluid connection circuit in the first mode and the compressor provides the shared coolant at a second pressure level, which is different than the first pressure level, to at least one evaporator using the shared coolant fluid connection circuit in the second mode;
wherein the ratio of the substantially steady state heat gain for the first compartment to the substantially steady state total heat gain for the overall cabinet is about 0.65:1 or greater; and
wherein the first compartment is a fresh food compartment at a temperature above freezing and the second compartment is at a temperature below freezing.

25. The appliance of claim 24, wherein the coolant system comprises a first evaporator and a second evaporator and wherein the single compressor comprises a single suction port and the flow of coolant is provided in a non-simultaneous manner to the first evaporator and the second evaporator.

26. The appliance of claim 24, wherein the single compressor has at least two suction ports and the flow of coolant is capable of being provided in a simultaneous manner to the first and second evaporators.

27. A multi-evaporator and single compressor containing appliance comprising:
a cabinet having an internal volume and comprising a first compartment having an internal volume spaced within the cabinet and a second compartment having an internal volume spaced within the cabinet where the first compartment and the second compartment are separated by a horizontal mullion to form the first compartment and the second compartment within the cabinet and wherein each compartment has at least one access door that only accesses that compartment and the overall cabinet has a substantially steady state total heat gain and the first compartment has a first compartment substantially steady state heat gain;
a first evaporator associated with the first compartment wherein the first evaporator operates at a first pressure level;
a second evaporator associated with the second compartment wherein the second evaporator operates at a second pressure level, which is a different pressure level than the first pressure level;
a single compressor operably connected to the first evaporator and the second evaporator wherein the single compressor is the only compressor associated with the appliance for regulating the temperature of the first compartment and the temperature of the second compartment;

wherein the single compressor and the first and second evaporators form two refrigeration circuits that provide a flow of coolant in a non-simultaneous manner to the first and second evaporators such that the two refrigeration circuits provide the first evaporator and the second evaporator with adjustable load capacities; and wherein the ratio of the substantially steady state heat gain for the first compartment to the substantially steady state total heat gain for the overall cabinet is about 0.65:1 or greater.

28. A method for improving the efficiency of an appliance comprising the steps of:

providing an appliance that comprises:

a cabinet having an internal volume and comprising a first compartment having an internal volume spaced within the cabinet and a second compartment having an internal volume spaced within the cabinet where the first compartment and the second compartment within the cabinet are separated by a horizontal mullion to form the first compartment and the second compartment within the cabinet and wherein each compartment has at least one access door that only accesses that compartment and the overall cabinet has a substantially steady state total heat gain and the first compartment has a first compartment substantially steady state heat gain;

a coolant system comprising:

at least one evaporator;

a single compressor operably connected to at least one evaporator where the single compressor is the only compressor associated with the appliance for regulating a temperature of the first compartment and a temperature of the second compartment;

a shared coolant fluid connection system that interconnects at least the single compressor and the at least one evaporator;

a coolant fluid spaced within the shared coolant fluid connection system used to regulate both the temperature of the first compartment and the second compartment; and wherein the compressor provides the shared coolant at at least two different pressures to at least one evaporator using the shared coolant fluid connection circuit; and shifting the overall thermal load of the appliance such that at least about 65% of the total substantially steady state heat gain of the overall cabinet is gained by the first compartment and thereby increasing the overall coefficient of performance.

29. The method of claim 28, wherein the appliance comprises:

a first evaporator associated with the first compartment wherein the first evaporator operates at a first pressure level;

a second evaporator associated with the second compartment wherein the second evaporator operates at a second pressure level, which is a different pressure level than the first pressure level;

wherein the single compressor is operably connected to the first evaporator and the second evaporator such that the two refrigeration circuits provide the first evaporator and the second evaporator with adjustable load capacities and the single compressor is the only compressor associated with the appliance for regulating the temperature of the first compartment and the temperature of the second compartment; and wherein the single compressor and the first and second evaporators form two refrigeration circuits that provide a flow of coolant to the first and second evaporators; and wherein the first compartment is a refrigeration compartment at a temperature above freezing during operation of the appliance.

30. The method of improving the efficiency of an appliance of claim 28, wherein the second compartment is a freezer compartment having walls surrounding the freezer compartment and the first compartment is a refrigeration compartment and wherein the ratio of the internal volume of the second compartment to the internal volume of the cabinet is from about 0.25:1 to 0.37:1 and the step of shifting the overall thermal load of the appliance comprises at least one step chosen from the group consisting of increasing the overall insulating capacity of the walls surrounding the freezer compartment, increasing the internal volume of the refrigeration compartment without increasing the size of the cabinet, and reducing the internal volume of the freezer compartment.

31. The method of improving the efficiency of an appliance of claim 29, wherein the second compartment is a freezer compartment having walls surrounding the freezer compartment and wherein the ratio of the internal volume of the second compartment to the internal volume of the cabinet is from about 0.25:1 to less than 0.37:1 and the step of shifting the overall thermal load of the appliance comprises at least one step chosen from the group consisting of increasing the overall insulating capacity of the walls surrounding the freezer compartment, increasing the internal volume of the refrigeration compartment without increasing the size of the cabinet, and reducing the internal volume of the freezer compartment.

32. The method of improving the efficiency of an appliance of claim 28, wherein a first evaporator functions at a first evaporator pressure providing cooling to the first compartment; and the first evaporator or a second evaporator functioning at a second evaporator pressure to provide cooling to the second compartment, and wherein the first evaporator pressure is higher than the second evaporator pressure.

* * * * *